US011726613B2

(12) United States Patent
Kim et al.

(10) Patent No.: US 11,726,613 B2
(45) Date of Patent: Aug. 15, 2023

(54) ELECTRONIC DEVICE FOR PREVENTING UNINTENDED RECEPTION OF USER INPUT BY USING ILLUMINANCE SENSOR AND DISPLAY, AND METHOD FOR OPERATING ELECTRONIC DEVICE

(71) Applicant: Samsung Electronics Co., Ltd., Suwon-si (KR)

(72) Inventors: Wooyoung Kim, Suwon-si (KR); Daehyun Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/427,774

(22) PCT Filed: Sep. 30, 2019

(86) PCT No.: PCT/KR2019/012765
§ 371 (c)(1),
(2) Date: Aug. 2, 2021

(87) PCT Pub. No.: WO2020/166781
PCT Pub. Date: Aug. 20, 2020

(65) Prior Publication Data
US 2022/0121314 A1 Apr. 21, 2022

(30) Foreign Application Priority Data
Feb. 13, 2019 (KR) .................. 10-2019-0016927

(51) Int. Cl.
G06F 3/041 (2006.01)
G06F 21/32 (2013.01)
G09G 3/20 (2006.01)

(52) U.S. Cl.
CPC ............ G06F 3/0418 (2013.01); G06F 21/32 (2013.01); G09G 3/2096 (2013.01); G09G 2360/144 (2013.01)

(58) Field of Classification Search
CPC ...... G06F 3/0418; G06F 3/2096; G06F 21/32; G09G 2360/144
See application file for complete search history.

(56) References Cited

U.S. PATENT DOCUMENTS

2007/0152966 A1* 7/2007 Krah .................. G06F 3/03543
345/163
2011/0267299 A1* 11/2011 Miyazaki ................ G06F 3/038
345/173

(Continued)

FOREIGN PATENT DOCUMENTS

CN 107786743 A 3/2018
CN 109067983 A 12/2018

(Continued)

OTHER PUBLICATIONS

European Search Report dated Feb. 9, 2022; European Appln No. 19915416.2-1231 / 3907588 PCT/KR2019012765.

*Primary Examiner* — Stephen G Sherman
(74) *Attorney, Agent, or Firm* — Jefferson IP Law, LLP

(57) ABSTRACT

An electronic device and a method for operating the electronic device are provided. The electronic device includes a housing which includes a first surface and a second surface facing the first surface, a display which is disposed on at least a part of the first surface, a proximity sensor which is disposed between the display and the second surface, an illuminance sensor, and a processor which is operably connected to the display and the illuminance sensor, wherein the processor is configured to activate the display and the illuminance sensor in response to the occurrence of an event, measure, by using the illuminance sensor, illuminance of a (Continued)

region where the electronic device is disposed, confirm the characteristic of an input occurring on the display by an external object, and determine, based on the measured illuminance and the characteristic of the input, whether or not to inactivate a touch input reception function of at least a partial region of the display.

15 Claims, 8 Drawing Sheets

(56) References Cited

U.S. PATENT DOCUMENTS

| | | | |
|---|---|---|---|
| 2011/0287754 A1 | 11/2011 | Schlueter | |
| 2014/0189397 A1* | 7/2014 | Kanai | G06F 1/1694 713/320 |
| 2014/0220959 A1* | 8/2014 | Mao | H04M 1/72484 455/418 |
| 2016/0366273 A1* | 12/2016 | Kobayashi | G06F 3/0488 |
| 2017/0045918 A1* | 2/2017 | Han | G06F 1/1684 |
| 2017/0285868 A1 | 10/2017 | Gan et al. | |
| 2018/0275815 A1* | 9/2018 | Lee | G06F 3/0412 |
| 2018/0348049 A1 | 12/2018 | Yoon et al. | |
| 2019/0020822 A1 | 1/2019 | Sharma et al. | |
| 2019/0034611 A1* | 1/2019 | Bergsell | G06V 40/1365 |
| 2019/0132441 A1 | 5/2019 | Li | |
| 2019/0244560 A1* | 8/2019 | Lee | G06F 1/1686 |

FOREIGN PATENT DOCUMENTS

| | | |
|---|---|---|
| CN | 109254684 A | 1/2019 |
| EP | 3 179 357 A1 | 6/2017 |
| EP | 3 477 423 A1 | 5/2019 |
| JP | 2011-059887 A | 3/2011 |
| JP | 2013-125361 A | 6/2013 |
| JP | 5890126 B2 | 3/2016 |
| JP | 2016-158144 A | 9/2016 |
| KR | 10-1249960 B1 | 4/2013 |
| KR | 10-1799462 B1 | 11/2017 |
| KR | 10-1823476 B1 | 1/2018 |
| KR | 10-2018-0131848 A | 12/2018 |

* cited by examiner

ELECTRONIC DEVICE FOR PREVENTING UNINTENDED RECEPTION OF USER INPUT BY USING ILLUMINANCE SENSOR AND DISPLAY, AND METHOD FOR OPERATING ELECTRONIC DEVICE

CROSS-REFERENCE TO RELATED APPLICATION(S)

This application is a U.S. National Stage application under 35 U.S.C. § 371 of an International application number PCT/KR2019/012765, filed on Sep. 30, 2019, which is based on and claims the benefit priority of a Korean patent application number 10-2019-0016927, filed on Feb. 13, 2019, in the Korean Intellectual Property Office, the disclosure of which is incorporated by reference herein in its entirety.

BACKGROUND

1. Field

The disclosure relates to an electronic device and a method for operating the electronic device. More particularly, the disclosure relates to technology to prevent an unintended user input from being received using an illuminance sensor and a display.

2. Description of Related Art

Various electronic devices, such as a smart phone, a tablet personal computer (PC), a portable multimedia player (PMP), a personal digital assistant (PDA), a laptop personal computer (laptop PC), and a wearable device, have been spread.

In order to provide more information to users of electronic devices, there is a trend that sizes of electronic devices and sizes of screens provided on the recent electronic devices are gradually increasing. Recently, the ratio of a display occupied on an electronic device is increasing, and thus there is a trend that the size of a bezel occupied on a front surface of the electronic device is gradually reduced.

As the size of the bezel of the electronic device is reduced, the size of an area, in which various electronic components (e.g., illuminance sensor and proximity sensor) being disposed on the bezel are disposed, is also reduced, and thus the electronic components disposed on the bezel are disposed at a bottom of a display panel.

A proximity sensor provided in the electronic device may output light of an infrared band, and may determine whether an external object (e.g., a part of a user's body) approaches the electronic device in accordance with the quantity of light reflected by the external object. If a user's unintended touch is input, the electronic device prevents the unintended touch input by disregarding the input touch based on the measurement results of the proximity sensor and the illuminance sensor.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, as aspect of the disclosure is to provide an electronic device in which a proximity sensor is disposed below a display, in case that the proximity sensor is activated when a display function is activated, infrared rays being output by the proximity sensor may exert an influence on a driving transistor of the display. For example, photoelectric effects may be generated by the infrared rays in the driving transistor. Due to the photoelectric effects generated by the infrared rays output by the proximity sensor, an unintended screen may be displayed on the display. For example, white dots caused by the infrared rays output by the proximity sensor may be displayed on the display. Further, the photoelectric effects by the infrared rays may reduce durability of the display.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first surface and a second surface facing the first surface, a display disposed on at least a part of the first surface, a proximity sensor disposed between the display and the second surface, an illuminance sensor, and a processor operatively connected to the display and the illuminance sensor, wherein the processor is configured to activate the display and the illuminance sensor in response to an occurrence of an event, measure an illumination of an area in which the electronic device is disposed using the illuminance sensor, identify characteristics of an input generated on the display by an external object, and determine whether to inactivate a reception function of a touch input on at least a partial area of the display based on the measured illumination and the characteristics of the input.

In accordance with another aspect of the disclosure, a method for operating an electronic device is provided. The method includes activating a display disposed on at least a part of a first surface of a housing and an illuminance sensor disposed between the display and a second surface in response to an occurrence of an event, measuring an illumination of an area in which the electronic device is disposed using the illuminance sensor, identifying characteristics of an input generated on the display by an external object, and determining whether to inactivate a reception function of a touch input on at least a partial area of the display based on the measured illumination and the characteristics of the input.

According to the electronic device and the method for operating the electronic device according to the various embodiments of the disclosure, it is possible to identify whether an input received using the illuminance sensor and the display is a user's unintended input without using the proximity sensor. Accordingly, it is possible to prevent an unintended screen display caused by the photoelectric effects that may be generated by the proximity sensor.

According to the electronic device and the method for operating the electronic device according to the various embodiments of the disclosure, it is possible to identify whether the input received using the illuminance sensor and the display is the user's unintended input without using the proximity sensor. Accordingly, it is possible to prevent the degrading of durability of the display caused by the photoelectric effects that may be generated by the proximity sensor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
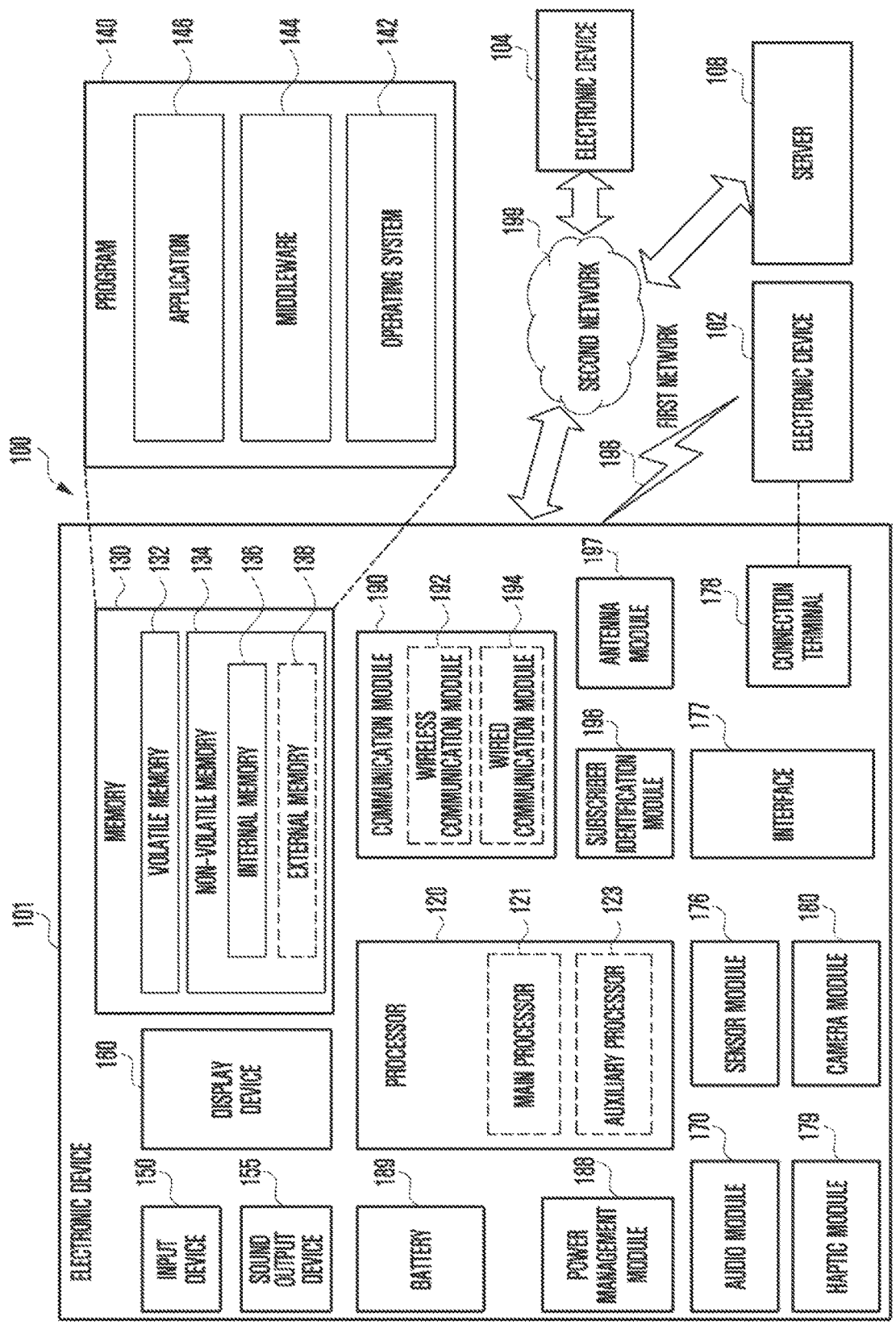
FIG. 1 is a block diagram of an electronic device according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
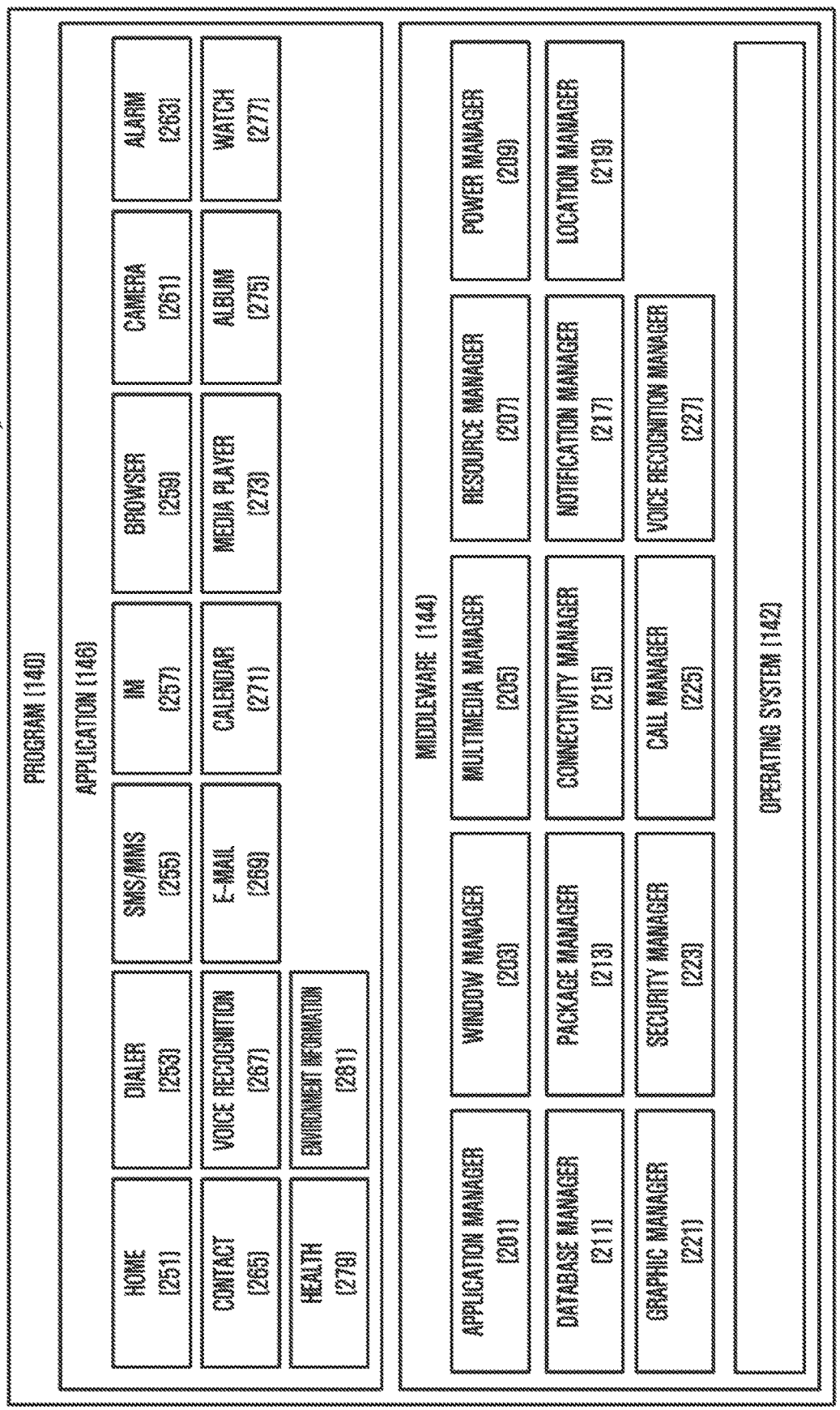
FIG. 2 is a block diagram exemplifying a program according to an embodiment of the disclosure.

FIG. 2 is a block diagram 200 illustrating the program 140 according to an embodiment of the disclosure.

Referring to FIG. 2, according to an embodiment of the disclosure, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment of the disclosure, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment of the disclosure, the middleware 244 may dynamically delete some existing components or add new components. According to an embodiment of the disclosure, at least part of the middleware 144 may be included as part of the OS 142 or may be implemented as another software separate from the OS 142.

The application 146 may include, for example, a home 251, a dialer 253, a short message service (SMS)/multimedia messaging service (MMS) 255, an instant message (IM) 257, a browser 259, a camera 261, an alarm 263, a contact 265, a voice recognition 267, an email 269, a calendar 271, a media player 273, an album 275, a watch 277, a health 279

(e.g., for measuring the degree of workout or biometric information, such as blood sugar), or environmental information 281 (e.g., for measuring air pressure, humidity, or temperature information) application. According to an embodiment of the disclosure, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
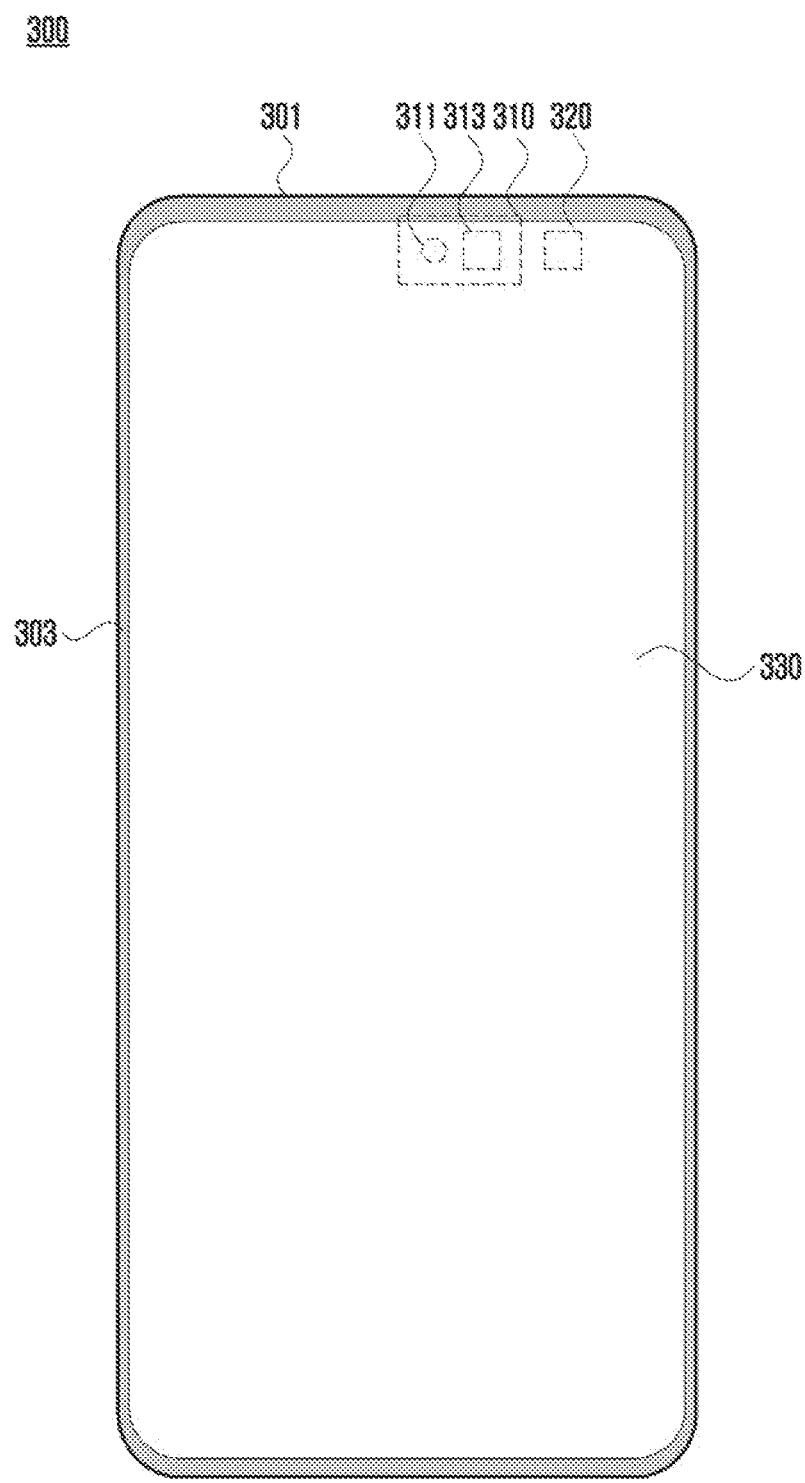
FIG. 3 is a diagram illustrating an electronic device according to an embodiment of the disclosure.

FIG. 3 is a diagram illustrating an electronic device according to an embodiment of the disclosure.

Referring to FIG. 3, an electronic device 300 (e.g., electronic device 101 of FIG. 1) according to various embodiments of the disclosure may include a housing 301, a proximity sensor 310 (e.g., sensor module 176 of FIG. 1), an illuminance sensor 320 (e.g., sensor module 176 of FIG. 1), and a display 330 (e.g., display device 160 of FIG. 1).

According to various embodiments of the disclosure, the housing 301 may mean an outer part surrounding the electronic device 300. The housing 301 may include a first surface 303, a second surface (not illustrated) facing the first surface 303, and a side member (not illustrated) surrounding a space between the first surface 303 and the second surface (not illustrated).

According to various embodiments of the disclosure, the display 330 may be disposed on at least a part of the first surface 303 of the housing 301, and may be exposed to outside through disposition on the part of the first surface 303. The display 330 may be implemented in various forms including a liquid crystal display (LCD) and an organic light emitting diode (OLED). Based on the control of a processor (e.g., processor 120 of FIG. 1), the display 330 may display various moving images or still images, and may receive inputs by various external objects (e.g., man's hand) on the display 330. The display 330 may include a touch sensor (not illustrated) in order to receive the inputs by the various external objects.

According to various embodiments of the disclosure, the touch sensor may be composed as a layer independent of a display panel of the display 330, or may be implemented as an integrated structure with the display panel. The touch sensor may receive a contact touch input that is a touch implemented through a direct contact between the external object and the display 330 or a proximity input that is a touch implemented through approaching in a state where the external object and the display 330 do not come in contact with each other.

According to various embodiments of the disclosure, the proximity sensor 310 may detect an external object approaching the electronic device 300. The proximity sensor 310 may include a light-emitting part 311 emitting infrared rays and a light-receiving part 313 receiving the infrared rays reflected from the external object.

According to various embodiments of the disclosure, the illuminance sensor 320 may measure illumination of a surrounding area of the electronic device 300. The illuminance sensor 320 may measure the illumination in a manner of measuring the quantity of light through a pre-created hole.

Recently, with the increase of electronic device implementing a design (e.g., bezel-less display) in which an area occupied by the display 330 on the first surface 303 increases, the size of the area, in which various components (e.g., proximity sensor 310 or illuminance sensor 320) disposed on the first surface 303 are to be disposed, becomes smaller. As the size of the area in which the components are to be disposed becomes smaller, there is an increasing trend that the electronic components are disposed between the display 330 and the second surface (not illustrated). According to various embodiments of the disclosure, the proximity sensor 310 and the illuminance sensor 320 may be disposed between the display 330 and the second surface (or at the bottom of the display 330).

According to various embodiments of the disclosure, in order to prevent user's unintended touch, data collected by the proximity sensor 310 and the illuminance sensor 320 may be used to determine whether the touch input received on the display 330 is a user's intended touch. For example, under the assumption that the electronic device 300 exists in a user's pocket, and when an event of the electronic device 300 occurs, the display 330 is activated to display a screen related to the event, the electronic device 300 may receive an input by an external object (e.g., user's thigh or clothes the user wears). The electronic device 300 may identify whether the external object is in a close situation using the proximity sensor 310, and identify the illumination of the surrounding area in which the electronic device 300 exists using the illuminance sensor 320, so that the electronic device 300 may identify that the electronic device 300 exists in the user's pocket, and may determine that the received input is the user's unintended touch.

According to various embodiments of the disclosure, if the proximity sensor 310 is disposed between the display 330 and the second surface (not illustrated), infrared rays being output by the light-emitting part 311 of the proximity sensor 310 may exert an influence on a driving transistor (not illustrated) of the display 330. For example, photoelectric effects may be generated by the infrared rays in the driving transistor. Due to the photoelectric effects generated by the infrared rays output by the proximity sensor 310, an unintended screen may be displayed on the display 330. For example, white dots caused by the infrared rays output by the proximity sensor 310 may be displayed on the display 330. Further, the photoelectric effects by the infrared rays may reduce durability of the display 330.

According to various embodiments of the disclosure, the electronic device 300 may determine the user's unintended touch in a manner not using the proximity sensor 310, and may inactivate the reception function of the touch input. Hereinafter, detailed embodiments to determine the user's unintended touch without using the proximity sensor 310 will be described.

Figure 4:
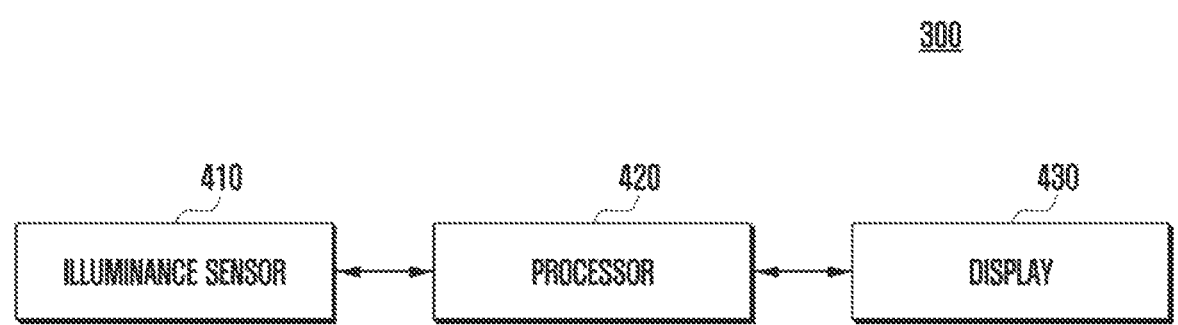
FIG. 4 is a block diagram of an electronic device according to an embodiment of the disclosure.

FIG. 4 is a block diagram of an electronic device according to an embodiment of the disclosure.

Referring to FIG. 4, an electronic device 300 according to various embodiments of the disclosure may include an illuminance sensor 410 (e.g., illuminance sensor 320 of FIG. 3), a processor 420 (e.g., processor 120 of FIG. 1), and a display 430 (e.g., display 330 of FIG. 3).

According to various embodiments of the disclosure, the illuminance sensor 410 may measure illumination of a surrounding area of the electronic device 300.

According to various embodiments of the disclosure, the display 430 may be disposed on at least a part of a first surface (e.g., first surface 303 of FIG. 3) of a housing (e.g., housing 301 of FIG. 3), and may be exposed to outside through disposition on the part of the first surface 303. The display 430 may perform a function of displaying various screens based on the control of the processor 420 and a function of receiving a touch input through reception of an input by an external object on the display 430.

According to various embodiments of the disclosure, the processor 420 may be operatively connected to the illuminance sensor 410 and the display 430, and may control the illuminance sensor 410 and the display 430. The processor 420 may mean any one of an application processor, a communication processor, and a supplementary processor.

According to various embodiments of the disclosure, the processor 420 may detect the event occurrence, and may activate the illuminance sensor 410 and the display 430 in response to the event occurrence.

According to various embodiments of the disclosure, the event occurrence may mean the occurrence of various events including an event of receiving an input to press various physical buttons existing on an outer surface of the electronic device 300 and various buttons implemented by software, and an event occurring from various applications installed in the electronic device 300 (e.g., call reception event occurring from a call application, text reception event occurring from an SMS application, or notification event occurring from various applications).

According to various embodiments of the disclosure, if the event occurrence is detected, the processor 420 may control the display 430 to display a screen related to the event occurrence. The screen related to the event occurrence may mean various screens including an indicator indicating the event occurrence or information related to the event. While displaying the screen related to the event occurrence, the display 430 may activate an input reception function for receiving a touch input or a proximity input, and may maintain the activation state of the input reception function.

According to various embodiments of the disclosure, the processor 420 may activate the illuminance sensor 410 in response to the event occurrence, and may control the illuminance sensor 410 to measure the illumination of an area in which the electronic device 300 is disposed (e.g., user's pocket in case that the electronic device 300 exists in the user's pocket). The activation of the illuminance sensor 410 may be performed in parallel to the activation of the display 430.

According to various embodiments of the disclosure, the processor 420 may identify the illumination of the area in which the electronic device 300 is disposed based on data being transmitted by the illuminance sensor 410.

According to various embodiments of the disclosure, the processor 420 may receive an input signal being transmitted by the display 430. The input signal may mean a signal corresponding to an input generated on the display 430 by the external object (e.g., if the electronic device 300 exists in the user's pocket, the external object may mean a user's thigh or a part of the clothes that the user wears). The processor 420 may identify the characteristics of the input by the external object based on the input signal.

According to various embodiments of the disclosure, the characteristics of the input may mean various characteristics including the size of a contact area between the external object and the display 430, the location of the contact area, the number of contact areas between the external object and the display 430, time the external object comes in contact with the display 430, whether the external object and the display 430 come in contact with each other, whether the external object and the display 430 approach each other, and pressure that the external object applies onto the display 430.

According to various embodiments of the disclosure, the processor 420 may determine whether to inactivate the reception function of the touch input on the display 430 based on the illumination measured using the illuminance sensor 410 and the characteristics of the input. The inactivation of the reception function of the touch input on the display 430 may be implemented in a manner that a touch input integrated circuit (touch I/C) electrically connected to a touch panel connected to the display 430 does not transmit a touch signal corresponding to the touch input received by the display 430 to the processor 420.

According to various embodiments of the disclosure, the processor 420 may inactivate the reception function of the touch input on the display 430 in response to identifying that the measured illumination is equal to or lower than a predetermined illumination and identifying that a contact area between the external object and the display 430 is equal to or larger than a predetermined area.

According to various embodiments of the disclosure, the processor 420 may inactivate the reception function of the touch input on the display 430 in response to identifying that the measured illumination is equal to or lower than a predetermined illumination and identifying that the number of contact areas between the external object and the display 430 is equal to or larger than a predetermined number.

According to various embodiments of the disclosure, the user's unintended touch may be in the form of a multi-touch having a plurality of contact areas or a touch input having an area occupying a wide area (e.g., surface touch or palm touch). The processor 420 may determine the unintended touch by identifying that the contact area between the external object and the display 430 is equal to or larger than the predetermined area or identifying that the number of contact areas is equal to or larger than the predetermined number.

According to various embodiments of the disclosure, the processor 420 may identify whether the input by the external object is received within a predetermined time (e.g., 3 seconds). The processor 420 may maintain an activation state of the reception function of the touch input on the display 430, without inactivating the reception function of the touch input, in response to identifying that the input by the external object is received after the predetermined time. If the input by the external object is received within the predetermined time, the processor 420 may identify the characteristics of the input by the external object.

According to various embodiments of the disclosure, the processor 420 may activate the illuminance sensor 410 for a predetermined period, and may measure the illumination around the electronic device 300 plural times. For example, the processor 420 may activate the illuminance sensor 410 every 20 ms that is the predetermined period, and may measure, 30 times, the illumination around the electronic device 300 for 600 ms. The processor 420 may determine whether to inactivate the reception function of the touch input on the display 430 based on the illumination measured plural times and the characteristics of the input by the external object. For example, if the illumination determined through the measurement plural times exceeds a predetermined value, the processor 420 may maintain the activation state of the reception function of the touch input on the display 430. According to another embodiment of the disclosure, if an average of the illumination measured plural times exceeds the predetermined value, the processor 420 may maintain the activation state of the reception function of the touch input on the display 430.

According to various embodiments of the disclosure, the processor 420 may not accurately measure the illumination around the electronic device 300 due to light being output from the display 430 displaying the screen related to the event corresponding to the event occurrence. The processor 420 may perform correction of the illumination measured by the illumination sensor 410 based on the illumination of the light being output from the display 430. The processor 420 may identify the level of current being supplied to the display 430, and may perform correction of the illumination measured by the illumination sensor 410 based on the level of the current. The processor 420 may determine whether to inactivate the reception function of the touch input on the display 430 based on the corrected illumination and the characteristics of the input by the external object.

According to various embodiments of the disclosure, in response to the determination to inactivate the reception function of the touch input on the display 430, the processor 420 may control the touch input integrated circuit (touch I/C) electrically connected to the touch panel connected to the display 430 so that the touch input integrated circuit does not transmit the touch signal corresponding to the touch input received by the display 430 to the processor 420. The electronic device according to various embodiments of the disclosure may prevent the reception of the user's unintended touch using the illuminance sensor 410 and the display 430 without using the proximity sensor (e.g., proximity sensor 310 of FIG. 3).

According to various embodiments of the disclosure, the processor 420 may inactivate the reception function of the touch input on the display 430, and may display, on the display 430, an indicator indicating that the reception function of the touch input is inactivated. The indicator may be displayed to overlap on the screen related to the event.

According to various embodiments of the disclosure, the indicator may include an area for activating the reception function of the touch input on the display 430. The processor 420 may activate the reception function of the touch input with respect to the area for activating the reception function of the touch input. The processor 420 may maintain the inactivation state of the reception function of the touch input in the remaining area except for the area for activating the reception function of the touch input.

According to various embodiments of the disclosure, the processor 420 may reactivate the reception function of the touch input in accordance with a condition change while the reception function of the touch input is maintained in the inactivation state. The processor 420 may reactivate the reception function of the touch input in response to identifying that a predetermined condition is satisfied.

According to various embodiments of the disclosure, the predetermined condition may be a condition related to the illumination measured by the electronic device 300. For example, the predetermined condition may mean a condition satisfying that the illumination measured by the electronic device 300 is equal to or higher than (or exceeds) the predetermined illumination. The processor 420 may identify whether the illumination measured by the electronic device 300 is equal to or higher than the predetermined illumination, and may determine that the predetermined condition is satisfied if it is identified that the measured illumination is equal to or higher than the predetermined illumination.

According to various embodiments of the disclosure, the predetermined condition may mean a condition on which the electronic device 300 receives a specific input on the display 430. For example, if the electronic device 300 receives the user input (e.g., a touch input, a drag input, or input having a specific pressure or more) for the object (e.g., a specific area 530 of FIG. 5) being displayed on the display 430, the processor 420 may determine that the predetermined condition is satisfied.

According to various embodiments of the disclosure, the predetermined condition may be a condition related to posture information of the electronic device 300 (e.g., information indicating the posture change of the electronic device 300). For example, the processor 420 may identify whether the posture of the electronic device 300 satisfies a predetermined condition (e.g., user's posture to grip the electronic device 300).

According to various embodiments of the disclosure, the predetermined condition may be a condition on whether the processor 420 has received bio-information of the user of the electronic device 300 (e.g., fingerprint input of the user of the electronic device 300). For example, the processor 420 may identify whether the electronic device 300 has received the user's bio-information. The processor 420 may receive the user's bio-information using a fingerprint sensor module included in the sensor module (e.g., sensor module 176 of FIG. 1).

According to various embodiments of the disclosure, the indicator being displayed while the reception function of the touch input on the display 430 is inactivated may not be displayed since the reception function of the touch input is activated. For example, the processor 420 may reactivate the reception function of the touch input in response to identifying that the illumination measured by the illumination sensor 410 is equal to or higher than the predetermined illumination, and may end the display operation of the indicator. As another example, the processor 420 may reactivate the reception function of the touch input in response to the reception of the user input for the area for activating the reception function of the touch input included in the indicator, and may end the display operation of the indicator.

Figure 5:
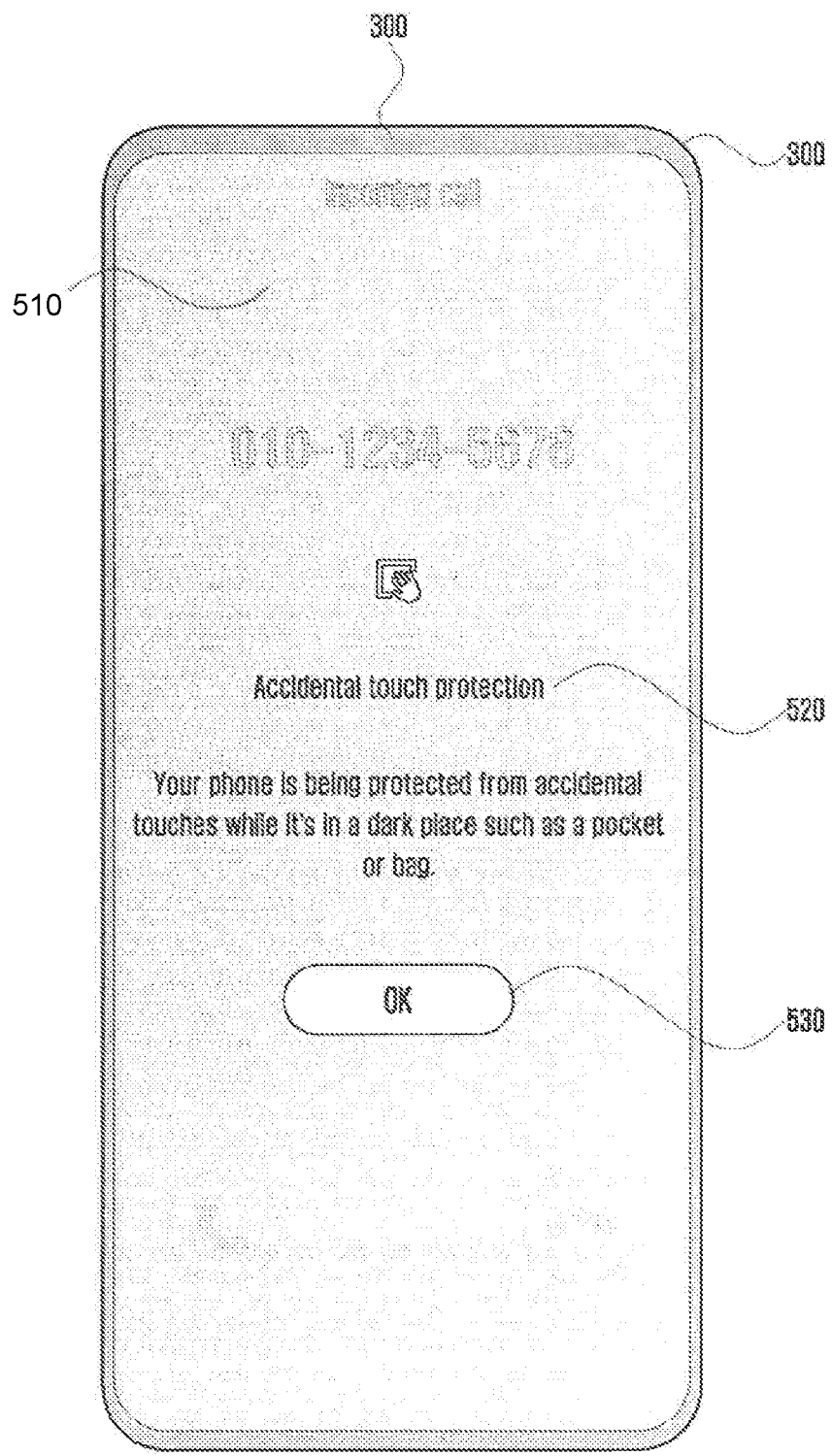
FIG. 5 is a diagram illustrating an indicator being displayed by an electronic device according to an embodiment of the disclosure.

FIG. 5 is a diagram illustrating an indicator being displayed by an electronic device according to an embodiment of the disclosure.

Referring to FIG. 5, an electronic device 300 according to various embodiments of the disclosure may inactivate a reception function of a touch input on a display 430, and may display an indicator 520 indicating that the reception function of the touch input is inactivated. The indicator 520 may be displayed to overlap on a screen related to an event.

Referring to FIG. 5, the electronic device 300 may display a screen for notifying of a call reception (screen related to an event) 510 in response to an occurrence of a call reception event. The electronic device 300 may inactivate the reception function of the touch input on the display 430 through the operation illustrated in FIG. 4, and may display the indicator 520 indicating that the reception function of the touch input is inactivated to overlap on the screen for notifying of the call reception.

According to various embodiments of the disclosure, the indicator 520 may include the area 530 for activating the reception function of the touch input on the display 430. The processor 420 may activate the reception function of the touch input with respect to the area 530 for activating the reception function of the touch input. The processor 420 may maintain the inactivation state of the reception function of the touch input on a remaining area except for the area 530 for activating the reception function of the touch input.

According to various embodiments of the disclosure, the processor 420 may reactivate the reception function of the touch input in response to the reception of the user input for the area 530 for activating the reception function of the touch input included in the indicator.

An electronic device according to various embodiments of the disclosure may include a housing including a first surface and a second surface facing the first surface, a display disposed on at least a part of the first surface, a proximity sensor disposed between the display and the second surface, an illuminance sensor, and a processor operatively connected to the display and the illuminance sensor, wherein the processor is configured to activate the display and the illuminance sensor in response to an occurrence of an event, measure an illumination of an area in which the electronic device is disposed using the illuminance sensor, identify characteristics of an input generated on the display by an external object, and determine whether to inactivate a reception function of a touch input on at least a partial area of the display based on the measured illumination and the characteristics of the input.

In the electronic device according to various embodiments of the disclosure, the processor may be configured to control the display to inactivate the reception function of the touch input on the display in response to identifying that the measured illumination is equal to or lower than a predetermined illumination and identifying that a contact area between the external object and the display is equal to or larger than a predetermined area.

In the electronic device according to various embodiments of the disclosure, the processor may be configured to control the display to inactivate the reception function of the touch input on the display in response to identifying that the measured illumination is equal to or lower than a predetermined illumination and identifying that the number of contact areas between the external object and the display is equal to or larger than a predetermined number.

In the electronic device according to various embodiments of the disclosure, the processor may be configured to: identify whether the input by the external object is received within a predetermined time, and control the display to maintain an activation state of the reception function of the touch input on the display in response to identifying that the input by the external object is received after the predetermined time.

In the electronic device according to various embodiments of the disclosure, the processor may be configured to display, on the display, an indicator indicating that the reception function of the touch input on the display is inactivated in response to inactivating of the reception function of the touch input on the display.

In the electronic device according to various embodiments of the disclosure, the indicator may include an area for activating the reception function of the touch input on the display.

In the electronic device according to various embodiments of the disclosure, the processor may be configured to maintain the inactivation of the reception function of the touch input on a remaining area except for the area for activating the reception function of the touch input on the display included in the indicator while the indicator is displayed.

In the electronic device according to various embodiments of the disclosure, the processor may be configured to reactivate the reception function of the touch input on the display in response to identifying that the measured illumination is equal to or higher than the predetermined illumination while inactivating the reception function of the touch input on the display.

In the electronic device according to various embodiments of the disclosure, the processor may be configured to: perform adjustments of the measured illumination based on the illumination of light generated due to the activation of the display, and determine whether to activate the reception function of the touch input on the display based on a result of comparing the adjusted illumination with a predetermined illumination.

In the electronic device according to various embodiments of the disclosure, the processor may be configured to: receive a user input for an area for activating the reception function of the touch input on the display, and determine whether to activate the reception function of the touch input on the display based on a result of comparing a pressure corresponding to the user input with a predetermined value.

In the electronic device according to various embodiments of the disclosure, the processor may be configured to: receive information related to a fingerprint of a user of the electronic device while inactivating the reception function of the touch input on the display, and determine whether to activate the reception function of the touch input on the display based on a result of authenticating the information related to the fingerprint.

Figure 6:
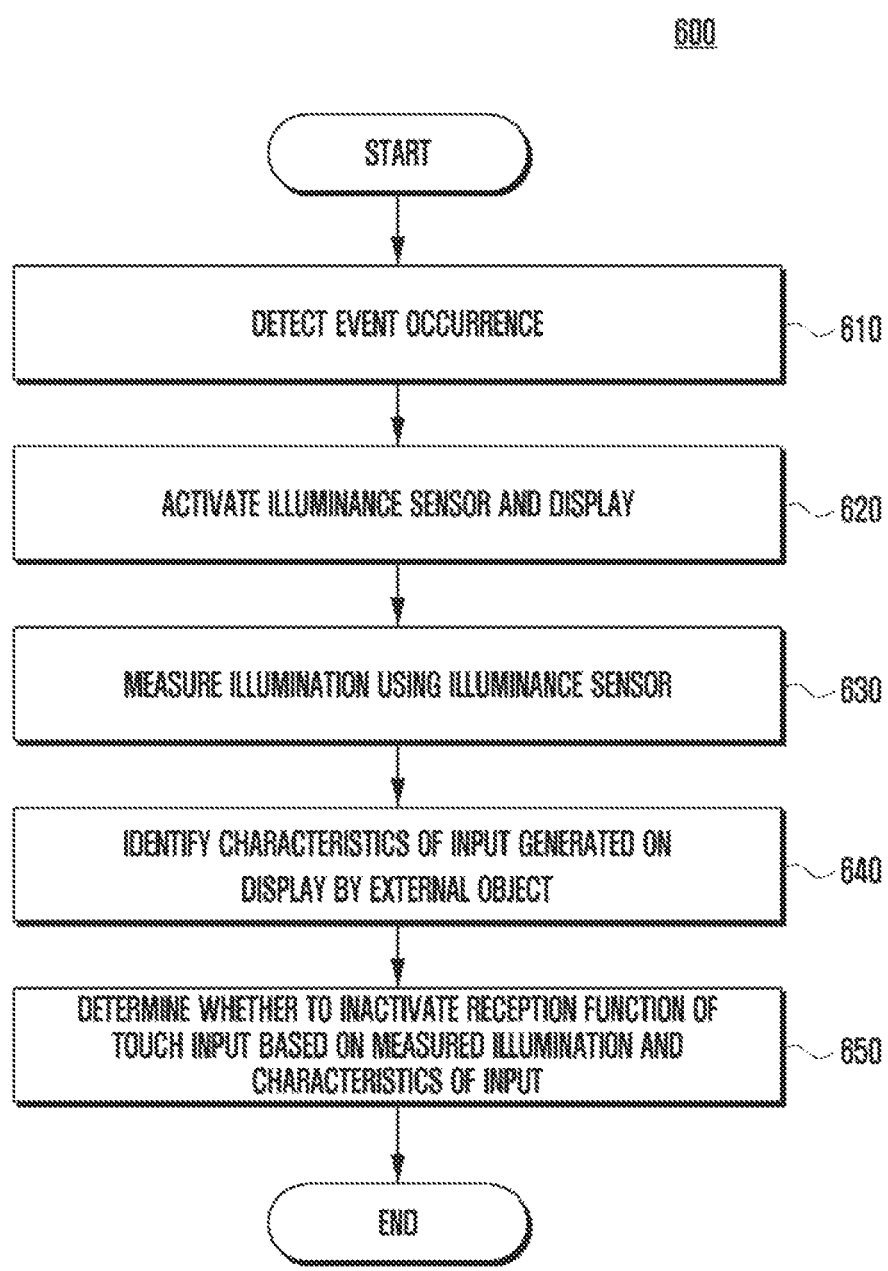
FIG. 6 is an operational flowchart illustrating a method for operating an electronic device according to an embodiment of the disclosure.

FIG. 6 is an operational flowchart illustrating a method for operating an electronic device in operation of 600 according to an embodiment of the disclosure.

Referring to FIG. 6, according to various embodiments of the disclosure, at operation 610, an electronic device (e.g., electronic device 300 of FIG. 3) may detect the occurrence of an event.

According to various embodiments of the disclosure, the event occurrence may mean the occurrence of various events including an event of receiving an input to press various buttons existing on an outer surface of the electronic device 300 or a button (e.g., home button being displayed on a display 430) implemented by software, and an event occurring from various applications installed in the electronic device 300 (e.g., call reception event occurring from a call application, text reception event occurring from an SMS application, or notification event occurring from various applications).

According to various embodiments of the disclosure, at operation 620, the electronic device 300 may activate an illuminance sensor (e.g., illuminance sensor 410 of FIG. 4) and a display (e.g., display 430 of FIG. 4).

According to various embodiments of the disclosure, the electronic device 300 may activate the illuminance sensor 410 in response to the event occurrence, and may control the illuminance sensor 410 to measure the illumination of an area in which the electronic device 300 is disposed (e.g., user's pocket in case that the electronic device 300 exists in the user's pocket). The activation of the illuminance sensor 410 may be performed in parallel to the activation of the display function of the display 430.

According to various embodiments of the disclosure, if the event occurrence is detected, the electronic device 300 may control the display 430 to display a screen related to the event occurrence. The screen related to the event occurrence may mean various screens including an indicator indicating the event occurrence or information related to the event. While displaying the screen related to the event occurrence, the display 430 may activate an input reception function for receiving a touch input or a proximity input, and may maintain the activation state of the input reception function.

According to various embodiments of the disclosure, at operation 630, the electronic device 300 may measure the illumination using the illuminance sensor 410. The electronic device 300 may receive data related to the intensity of light received by the illuminance sensor 410, and may identify the measured illumination.

According to various embodiments of the disclosure, at operation 640, the electronic device 300 may identify the characteristics of an input generated on the display by an external object.

According to various embodiments of the disclosure, the characteristics of the input may mean various characteristics including the size of a contact area between the external object and the display 430, the location of the contact area, the number of contact areas between the external object and the display 430, time the external object comes in contact with the display 430, whether the external object and the display 430 come in contact with each other, whether the external object and the display 430 approach each other, and pressure that the external object applies onto the display 430.

According to various embodiments of the disclosure, at operation 650, the electronic device 300 may determine whether to inactivate the reception function of the touch input on the display 430 based on the measured illumination and the characteristics of the input. The inactivation of the reception function of the touch input on the display 430 may be implemented in a manner that a touch input integrated circuit (touch I/C) electrically connected to a touch panel connected to the display 430 does not transmit a touch signal corresponding to the touch input received by the display 430 to the processor 420.

According to various embodiments of the disclosure, the electronic device 300 may inactivate the reception function of the touch input on the display 430 in response to identifying that the measured illumination is equal to or lower than a predetermined illumination and identifying that a contact area between the external object and the display 430 is equal to or larger than a predetermined area.

According to various embodiments of the disclosure, the electronic device 300 may inactivate the reception function of the touch input on the display 430 in response to identifying that the measured illumination is equal to or lower than a predetermined illumination and identifying that the number of contact areas between the external object and the display 430 is equal to or larger than a predetermined number.

According to various embodiments of the disclosure, the user's unintended touch may be in the form of a multi-touch having a plurality of contact areas or a touch input having an area occupying a wide area (e.g., surface touch or palm touch). The electronic device 300 may determine the unintended touch by identifying that the contact area between the external object and the display 430 is equal to or larger than the predetermined area or identifying that the number of contact areas is equal to or larger than the predetermined number.

Figure 7:
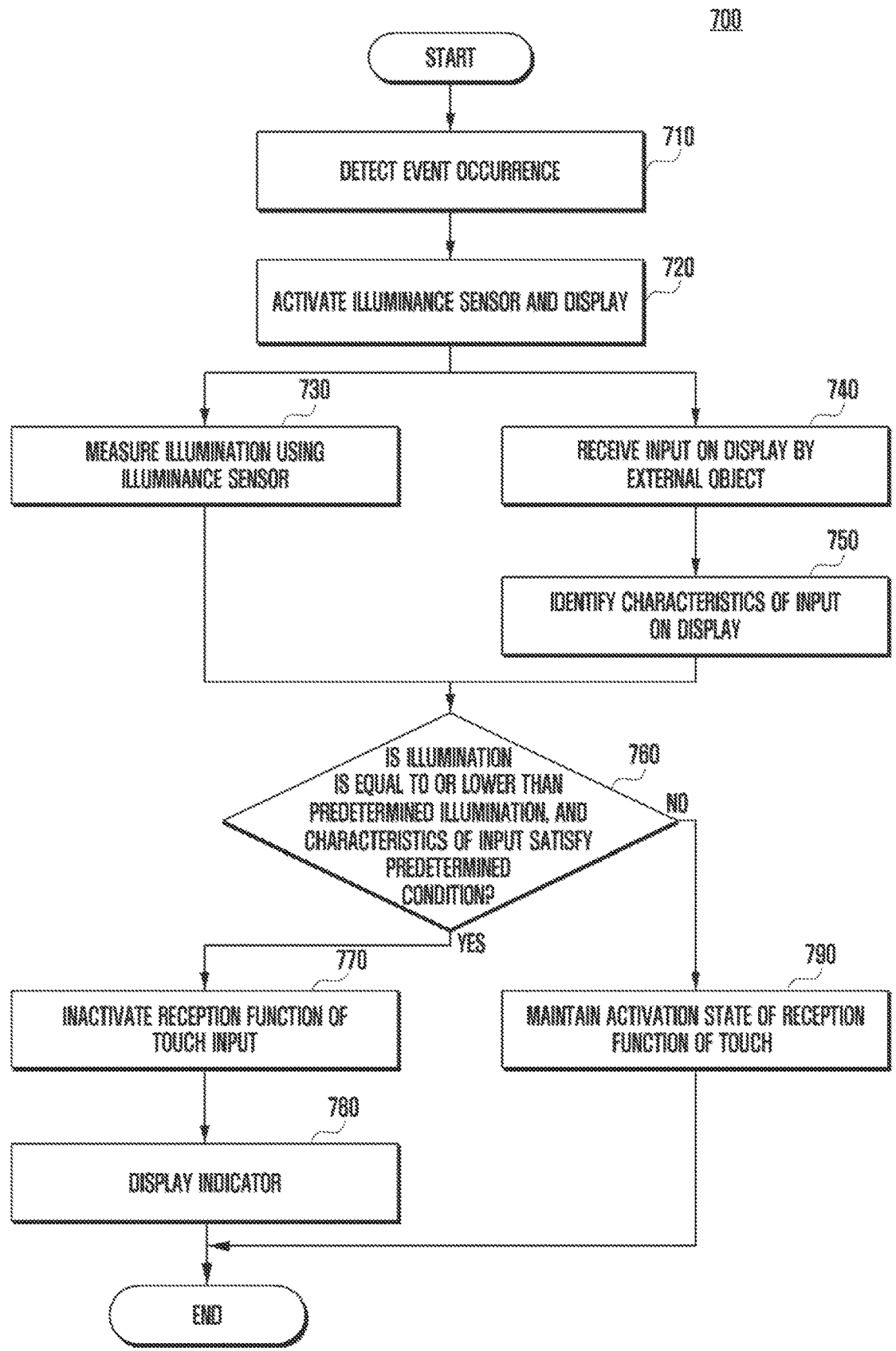
FIG. 7 is an operational flowchart illustrating an operation of displaying an indicator in a method for operating an electronic device according to an embodiment of the disclosure.

FIG. 7 is an operational flowchart 700 illustrating an operation of displaying an indicator in a method for operating an electronic device according to an embodiment of the disclosure.

Referring to FIG. 7, according to various embodiments of the disclosure, at operation 710, an electronic device (e.g., electronic device 300 of FIG. 3) may detect the occurrence of an event.

According to various embodiments of the disclosure, the event occurrence may mean the occurrence of various events including an event of receiving an input to press various buttons existing on an outer surface of the electronic device 300 or a button (e.g., home button being displayed on a display 430) implemented by software, and an event occurring from various applications installed in the electronic device 300 (e.g., call reception event occurring from a call application, text reception event occurring from an SMS application, or notification event occurring from various applications).

According to various embodiments of the disclosure, at operation 720, the electronic device 300 may activate an illuminance sensor (e.g., illuminance sensor 410 of FIG. 4) and a display (e.g., the display 430 of FIG. 4).

According to various embodiments of the disclosure, the electronic device 300 may activate the illuminance sensor 410 in response to the event occurrence, and may control the illuminance sensor 410 to measure the illumination of an area in which the electronic device 300 is disposed (e.g., user's pocket in case that the electronic device 300 exists in the user's pocket). The activation of the illuminance sensor 410 may be performed in parallel to the activation of the display 430.

According to various embodiments of the disclosure, at operation 730, the electronic device 300 may measure the illumination of the area in which the electronic device 300 is disposed using the illuminance sensor 410.

According to various embodiments of the disclosure, at operation 740, the electronic device 300 may receive an input on the display 430 by an external object.

According to various embodiments of the disclosure, at operation 750, the electronic device 300 may identify the characteristics of the input on the display 430 by the external object.

According to various embodiments of the disclosure, the characteristics of the input may mean various characteristics including the size of a contact area between the external object and the display 430, the location of the contact area, the number of contact areas between the external object and the display 430, time the external object comes in contact with the display 430, whether the external object and the display 430 come in contact with each other, whether the external object and the display 430 approach each other, and pressure that the external object applies onto the display 430.

According to various embodiments of the disclosure, at operation 760, the electronic device 300 may identify whether the measured illumination is equal to or lower than a predetermined illumination and the characteristics of the input satisfy a predetermined condition.

According to various embodiments of the disclosure, at operation 770, the electronic device 300 may inactivate the reception function of the touch input on the display 430 in response to identifying that the measured illumination is equal to or lower than the predetermined illumination and the characteristics of the input satisfy the predetermined condition.

According to various embodiments of the disclosure, the predetermined condition may include a condition on which a contact area between the external object and the display 430 is equal to or larger than a predetermined area or the number of contact areas between the external object and the display 430 is equal to or larger than a predetermined number.

According to various embodiments of the disclosure, at operation 780, the electronic device 300 may display an indicator (e.g., indicator 520 of FIG. 5).

According to various embodiments of the disclosure, at operation 790, the electronic device 300 may maintain the activation state of the reception function of the touch input on the display 430 in response to identifying that the measured illumination is equal to or higher than the predetermined illumination or the characteristics of the input do not satisfy the predetermined condition.

Figure 8:
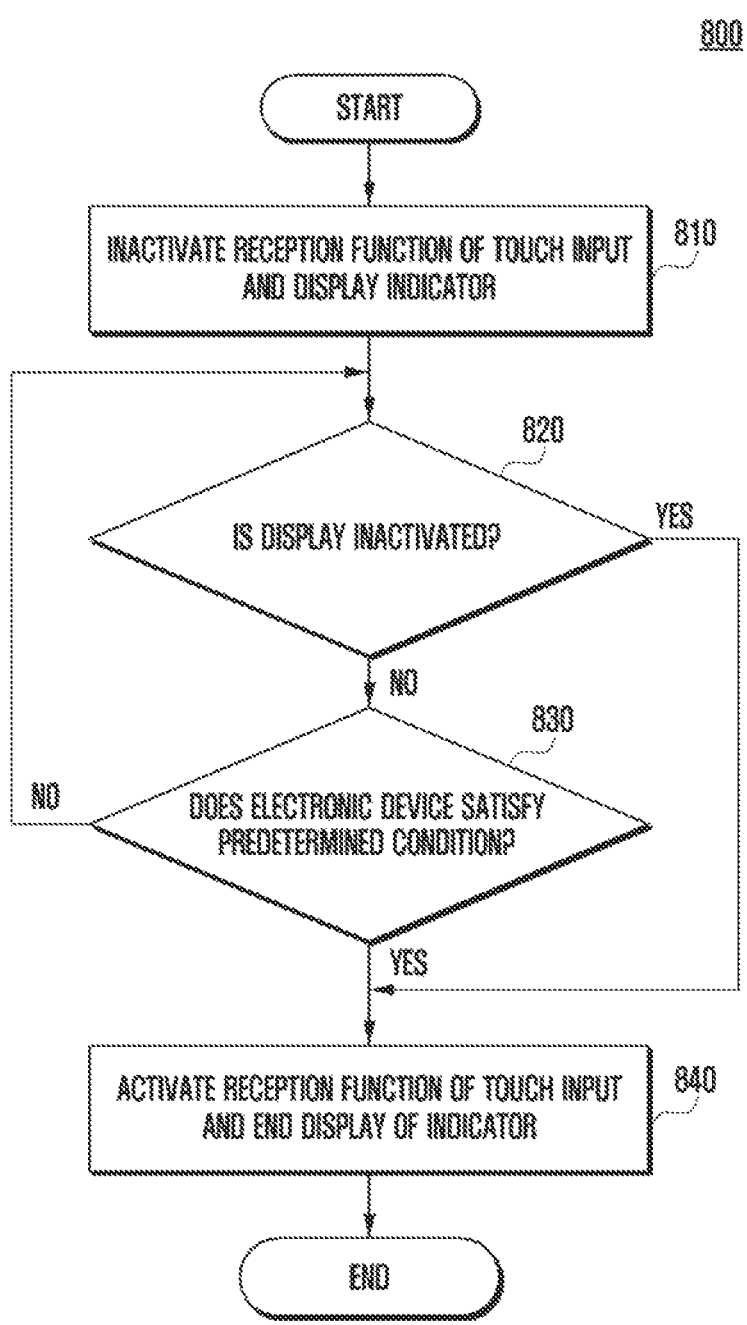
FIG. 8 is an operational flowchart illustrating an embodiment to end a display operation of an indicator in a method for operating an electronic device according to an embodiment of the disclosure.

FIG. 8 is an operational flowchart illustrating an embodiment to end a display operation of an indicator in operation of 800 in a method for operating an electronic device according to an embodiment of the disclosure.

Referring to FIG. 8, according to various embodiments of the disclosure, at operation 810, the electronic device 300 may inactivate a reception function of a touch input, and may display an indicator (e.g., indicator 520 of FIG. 5).

According to various embodiments of the disclosure, at operation 820, the electronic device 300 may identify whether the display 430 is in an inactivation state.

According to various embodiments of the disclosure, in the electronic device 300, the processor 420 may identify whether a display function for the display 430 to display a screen is in an inactivation state. The display 430 may enter the inactivation state of the display function in response to reception of an input of a screen lock button by a user.

According to various embodiments of the disclosure, at operation 830, the electronic device 300 may identify whether the electronic device 300 satisfies a predetermined condition in response to identifying that the display 430 is not in the inactivation state.

According to various embodiments of the disclosure, the predetermined condition may be a condition related to the illumination measured by the electronic device 300. For example, the predetermined condition may mean a condition satisfying that the illumination measured by the electronic device 300 is equal to or higher than (or exceeds) the predetermined illumination. The electronic device 300 may identify whether the illumination measured by the electronic device 300 is equal to or higher than the predetermined illumination, and may determine that the predetermined condition is satisfied if it is identified that the measured illumination is equal to or higher than the predetermined illumination.

According to various embodiments of the disclosure, the predetermined condition may mean a condition on which the electronic device 300 receives a specific input on the display 430. For example, if the electronic device 300 receives the user input (e.g., the touch input, the drag input, or input having a specific pressure or more) for the object (e.g., the specific area 530 of FIG. 5) being displayed on the display 430, the electronic device 300 may determine that the predetermined condition is satisfied.

According to various embodiments of the disclosure, the predetermined condition may be a condition related to posture information of the electronic device 300 (e.g., information indicating the posture change of the electronic device 300). For example, the electronic device 300 may identify whether the posture of the electronic device 300 satisfies a predetermined condition (e.g., user's posture to grip the electronic device 300).

According to various embodiments of the disclosure, the predetermined condition may be a condition whether the electronic device 300 has received bio-information of the user of the electronic device 300 (e.g., fingerprint input of the user of the electronic device 300). For example, the electronic device 300 may identify whether the electronic device 300 has received the user's bio-information. The electronic device 300 may receive the user's bio-information using a fingerprint sensor module included in the sensor module (e.g., sensor module 176 of FIG. 1).

According to various embodiments of the disclosure, at operation 840, the electronic device 300 may activate the reception function of the touch input on the display 430 in response to identifying that the electronic device satisfies the predetermined condition, and may end the display of the indicator 520.

A method for operating an electronic device according to various embodiments of the disclosure may include activating a display disposed on at least a part of a first surface of a housing and an illuminance sensor disposed between the display and a second surface facing the first surface of the housing in response to an occurrence of an event, measuring an illumination of an area in which the electronic device is disposed using the illuminance sensor, identifying characteristics of an input generated on the display by an external object, and determining whether to inactivate a reception function of a touch input on at least a partial area of the display based on the measured illumination and the characteristics of the input.

In the method for operating the electronic device according to various embodiments of the disclosure, determining whether to inactivate the reception function of the touch input may include controlling the display to inactivate the reception function of the touch input on the display in response to identifying that the measured illumination is equal to or lower than a predetermined illumination and identifying that a contact area between the external object and the display is equal to or larger than a predetermined area.

In the method for operating the electronic device according to various embodiments of the disclosure, determining whether to inactivate the reception function of the touch input may include controlling the display to inactivate the reception function of the touch input on the display in response to identifying that the measured illumination is equal to or lower than a predetermined illumination and identifying that the number of contact areas between the external object and the display is equal to or larger than a predetermined number.

In the method for operating the electronic device according to various embodiments of the disclosure, determining whether to inactivate the reception function of the touch input may include: identifying whether the input by the external object is received within a predetermined time, and controlling the display to maintain activation of the reception function of the touch input on the display in response to identifying that the input by the external object is received after the predetermined time.

The method for operating the electronic device according to various embodiments of the disclosure may further include displaying, on the display, an indicator indicating that the reception function of the touch input on the display is inactivated in response to inactivating of the reception function of the touch input on the display.

In the method for operating the electronic device according to various embodiments of the disclosure, the indicator may include an area for activating the reception function of the touch input on the display.

The method for operating the electronic device according to various embodiments of the disclosure may further include maintaining the inactivation of the reception function of the touch input on a remaining area except for the area for activating the reception function of the touch input on the display included in the indicator while the indicator is displayed.

The method for operating the electronic device according to various embodiments of the disclosure may further include reactivating the reception function of the touch input on the display in response to identifying that the measured illumination is equal to or higher than the predetermined illumination while inactivating the reception function of the touch input on the display.

The method for operating the electronic device according to various embodiments of the disclosure may further include receiving a user input for an area for activating the reception function of the touch input on the display while inactivating the reception function of the touch input on the display, and determining whether to activate the reception function of the touch input on the display based on a result of comparing a pressure corresponding to the user input with a predetermined value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a housing including a first surface and a second surface facing the first surface;
a display disposed on at least a part of the first surface;
a proximity sensor disposed between the display and the second surface;
an illuminance sensor; and
a processor connected to the display and the illuminance sensor operatively,
wherein the processor is configured to:
activate the display and the illuminance sensor in response to an occurrence of an event,
measure an illumination of an area in which the electronic device is disposed using the illuminance sensor,
identify characteristics of an input generated on the display by an external object, the characteristics of the input generated on the display comprising a size of a contact area between the external object and the display and a number of contact areas between the external object and the display, and
determine whether to inactivate a reception function of a touch input on at least a partial area of the display based at least in part on the measured illumination, the size of a contact area between the external object and the display, and the number of contact areas between the external object and the display, without the use of the proximity sensor.

2. The electronic device of claim 1, wherein the processor is further configured to control the display to inactivate the reception function of the touch input on the display in response to identifying that the measured illumination is equal to or lower than a predetermined illumination and identifying that the size of the contact area between the external object and the display is equal to or larger than a predetermined area.

3. The electronic device of claim 1, wherein the processor is further configured to control the display to inactivate the reception function of the touch input on the display in response to identifying that the measured illumination is equal to or lower than a predetermined illumination and identifying that the number of contact areas between the external object and the display is equal to or larger than a predetermined number.

4. The electronic device of claim 1, wherein the processor is further configured to:
identify whether the input by the external object is received within a predetermined time, and
control the display to maintain an activation state of the reception function of the touch input on the display in response to identifying that the input by the external object is received after the predetermined time.

5. The electronic device of claim 1, wherein the processor is further configured to display, on the display, an indicator indicating that the reception function of the touch input on the display is inactivated in response to inactivating of the reception function of the touch input on the display.

6. The electronic device of claim 5, wherein the indicator comprises an area for activating the reception function of the touch input on the display.

7. The electronic device of claim 6, wherein the processor is further configured to maintain the inactivation of the reception function of the touch input on a remaining area except for the area for activating the reception function of the touch input on the display included in the indicator while the indicator is displayed.

8. The electronic device of claim 1, wherein the processor is further configured to reactivate the reception function of the touch input on the display in response to identifying that the measured illumination is equal to or higher than a predetermined illumination while the reception function of the touch input on the display is inactive.

9. The electronic device of claim 1, wherein the processor is further configured to:
perform adjustments of the measured illumination based on the illumination of light generated due to the activation of the display, and
determine whether to activate the reception function of the touch input on the display based on a result of comparing the adjusted illumination with a predetermined illumination.

10. The electronic device of claim 1, wherein the processor is further configured to:
receive a user input for an area for activating the reception function of the touch input on the display, and
determine whether to activate the reception function of the touch input on the display based on a result of comparing a pressure corresponding to the user input with a predetermined value.

11. The electronic device of claim 1, wherein the processor is further configured to:
receive information related to a fingerprint of a user of the electronic device while inactivating the reception function of the touch input on the display, and
determine whether to activate the reception function of the touch input on the display based on a result of authenticating the information related to the fingerprint.

12. A method for operating an electronic device, the method comprising:
activating a display disposed on at least a part of a first surface of a housing and an illuminance sensor disposed between the display and a second surface in response to an occurrence of an event;
measuring an illumination of an area in which the electronic device is disposed using the illuminance sensor;
identifying characteristics of an input generated on the display by an external object, the characteristics of the input generated on the display comprise a size of a contact area between the external object and the display and a number of contact areas between the external object and the display; and
determining whether to inactivate a reception function of a touch input on at least a partial area of the display based at least in part on the measured illumination, the size of a contact area between the external object and the display, and the number of contact areas between the external object and the display, without the use of a proximity sensor.

13. The method of claim 12, wherein the determining of whether to inactivate the reception function of the touch input comprises:
controlling the display to inactivate the reception function of the touch input on the display in response to identifying that the measured illumination is equal to or lower than a predetermined illumination; and
identifying that the size of the contact area between the external object and the display is equal to or larger than a predetermined area.

14. The method of claim 12, wherein the determining of whether to inactivate the reception function of the touch input comprises;
controlling the display to inactivate the reception function of the touch input on the display in response to identifying that the measured illumination is equal to or lower than a predetermined illumination; and identifying that the number of contact areas between the external object and the display is equal to or larger than a predetermined number.

15. The method of claim 12, wherein the determining of whether to inactivate the reception function of the touch input comprises:

identifying whether the input by the external object is received within a predetermined time; and controlling the display to maintain activation of the reception function of the touch input on the display in response to identifying that the input by the external object is received after the predetermined time.

\* \* \* \* \*